Dec. 7, 1965   B. I. T. LARSSON   3,221,607
METHOD AND A MACHINE FOR CUTTING AND/OR TREATING
THREADS ON ROD-SHAPED WORK PIECES
Filed April 29, 1963   4 Sheets-Sheet 3

Dec. 7, 1965   B. I. T. LARSSON   3,221,607
METHOD AND A MACHINE FOR CUTTING AND/OR TREATING
THREADS ON ROD-SHAPED WORK PIECES
Filed April 29, 1963   4 Sheets-Sheet 4

3,221,607
METHOD AND A MACHINE FOR CUTTING AND/OR TREATING THREADS ON ROD-SHAPED WORK PIECES
Bertil Ivar Torsten Larsson, Norregard, Bredaryd, Sweden, assignor to Aktiebolaget Sigfrid Stenberg, Nassjo, Sweden, a corporation of Sweden
Filed Apr. 29, 1963, Ser. No. 276,636
Claims priority, application Sweden, Apr. 30, 1962, 4,846
4 Claims. (Cl. 90—11.42)

This invention has reference to a method for cutting and/or treating threads in a rod-shaped work piece in a machine tool, e.g. a milling machine, with a chip cutting tool, said work piece together with guide screw axially arranged relative to said work piece during rotation the guide screw thereby being brought to axially move past the cutting tool, the latter being forced into the surface of the work piece. A principal feature of the invention is that the cutting tool be brought first to engage the threads of the guide screw passing through a nut on the machine tool, said nut being stationary during work and that said cutting tool, when the work piece is moved closer to the nut, will engage the work piece and that the work piece, upon being provided with a thread, itself will serve as a guide screw when it reaches and enters said nut.

The invention also has reference to a machine for carrying into effect the above recited method and this machine is provided with a rotably driven chip cutting tool and a nut, which is adjustable relative to said tool and is passed through by a driven guide screw with a device for its axial coupling to a work piece of rod shape. The machine tool according to the invention also comprises means for moving the work piece during rotation when the same has been provided with threads by means of the cutting tool axially through said nut in such a way that the work piece thereupon can serve as a guide screw.

An important advantage obtained by the invention is that work pieces of an almost unlimited length can be treated in the machine and nevertheless the machine will have a shorter length than previously known machine tools for continuously cutting threads in rod-shaped work pieces. There is further obtained an outstanding exactness.

Figure 1:
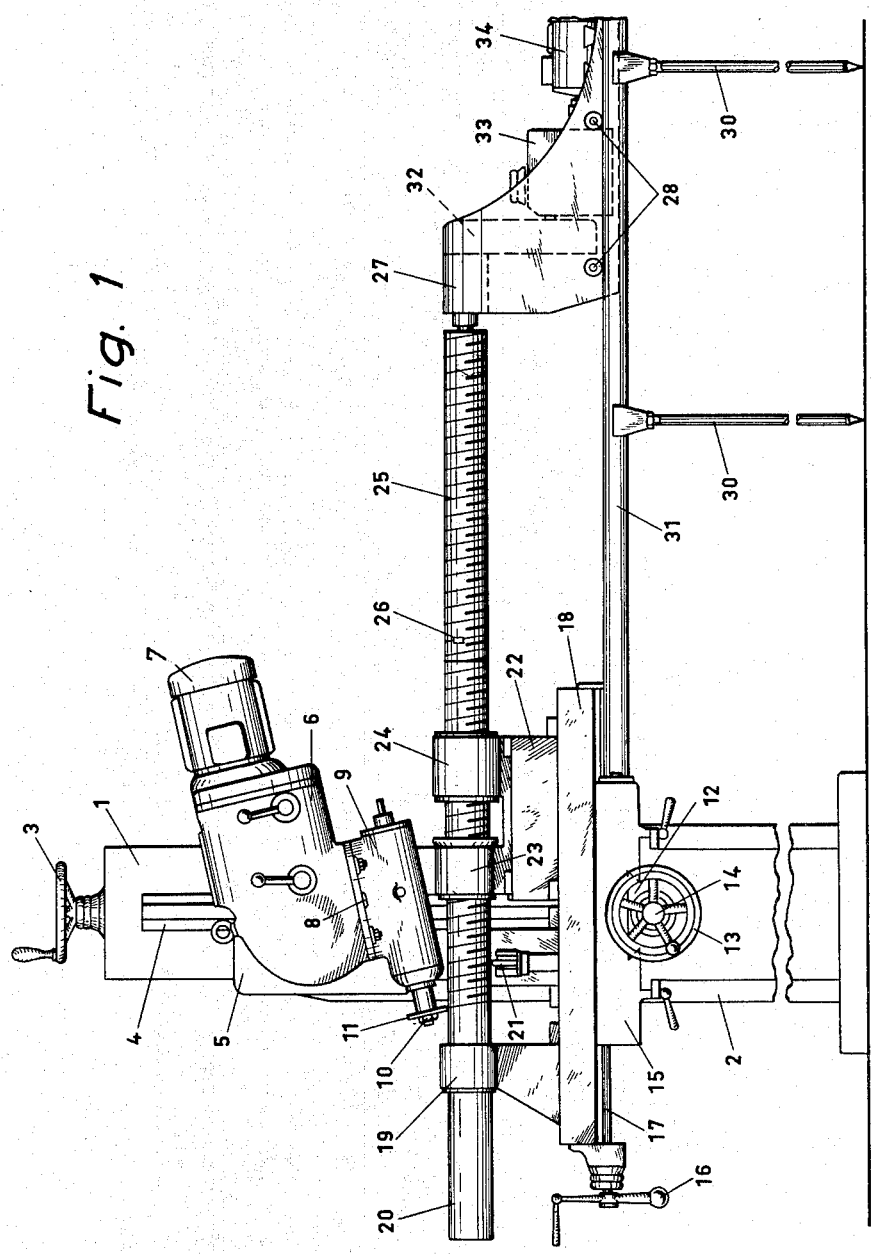
Figure 2:
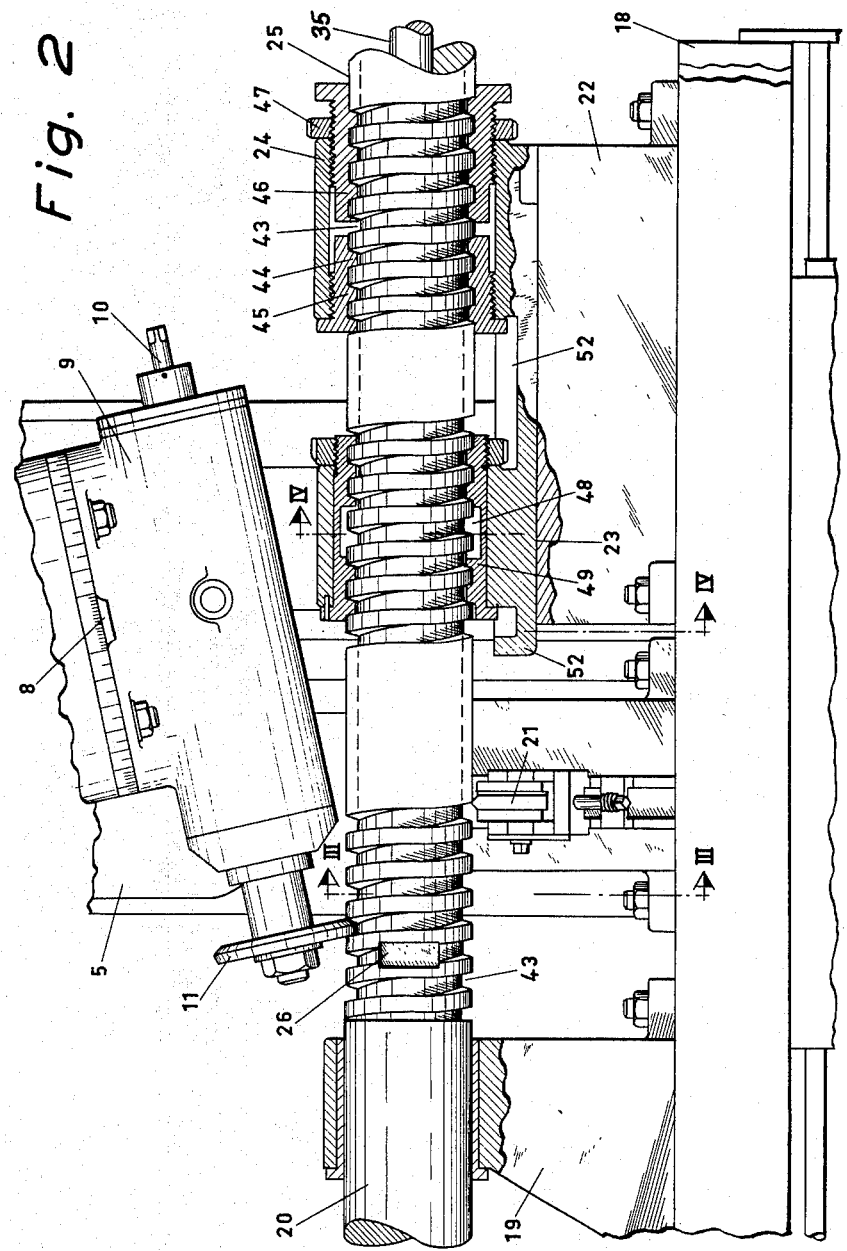
Figure 3:
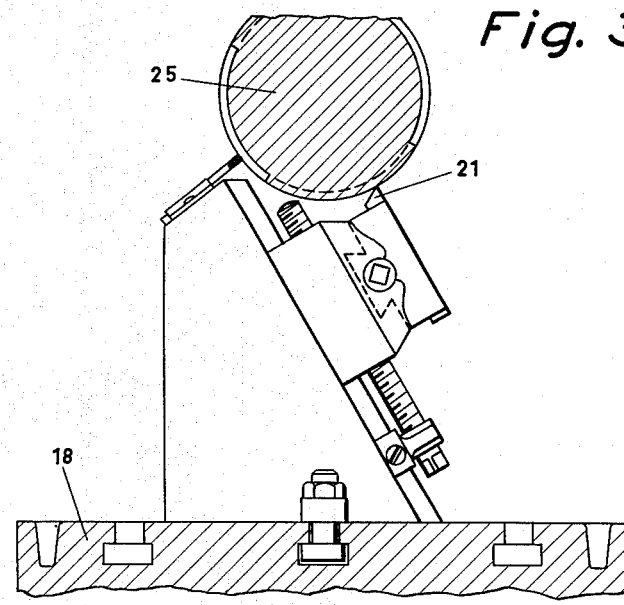
Figure 4:
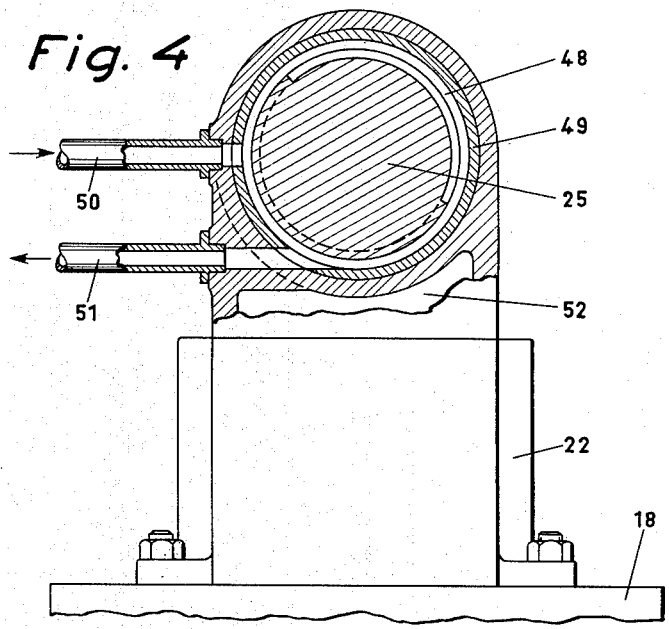
Figure 5:
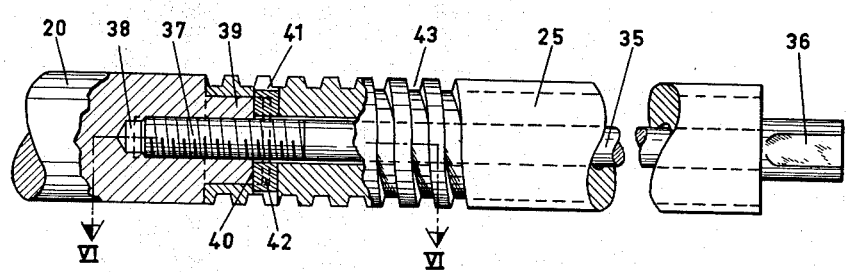
Figure 6:
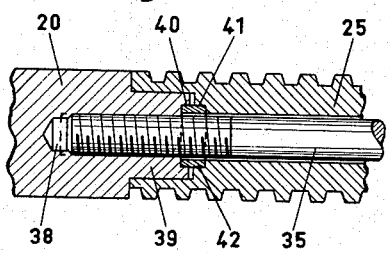
Figure 7:
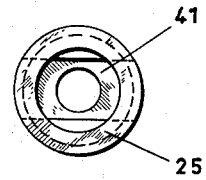

An example of a machine in accordance with the invention will now be described with reference to the accompanying, partly diagrammatic drawings, in which:

FIG. 1 is a front elevation of a machine tool according to the invention,

FIG. 2 is a fragmentary front elevation of the view, partly in section, parts of the machine in the vicinity of which the cutting work proper is carried out, FIG. 3 is a cross section through the machine on the line III—III in FIG. 2 and illustrates a trimming device, FIG. 4 is a cross section taken on the line IV—IV in FIG. 2 and illustrates a flushing device, FIG. 5 is a longitudinal section through the device for axial coupling of the guide screw of the machine and the work piece to be provided with threads, FIG. 6 is a similar longitudinal section through the coupling device on the line VI—VI in FIG. 5, and FIG. 7 is an end elevation view of the guide screw seen from the left according to FIG. 5.

On a vertical guide 1 of a machine stand 2 is mounted, by means of a screw spindle 4 having a crank 3, a movable a headstock 5 having a gear box 6 which is turnable relative to said headstock in a vertical plane and provided with an electric motor 7. On the under side of the gear box 6 there is pivoted about a tenon 8 a spindle housing 9 with a working spindle 10 driven by the motor 7. The spindle carries on one end a cutting tool, e.g. a cutter 11. A cross slide 15 is mounted movable on a horizontal guide 12 by means of a screw spindle 14 with a crank 13 and is movable in the direction to and fro relative to guide 1. The slide 15 carries a slide 18 which is movable in the longitudinal direction of the machine by means of a screw spindle 17 with a crank 16. The slide 18 in its turn carries an abutment bearing 19 for a rod-shaped work piece 20 to be provided with screw threads by means of the cutter 11. The slide 18 also carries a trimming tool 21 positioned for trimming the dressing and thread and on a bracket 22 a device 23 for removing, flushing or otherwise brushing off metal chips from the work piece as well as a nut housing 24 housing a guide nut for a guide screw 25 of the machine. The work piece 20 can be coupled axially to the guide screw 25 by means of a device to be later described in detail in the reference to FIG. 2. The end of the guide screw 25 situated opposite the coupling device 26 is carried by a headstock 27 which is movable on rollers 28 or equivalent means on a guide 29 extending in the longitudinal direction of the machine. The guide 29 preferably comprises two parallel rails 31, e.g. tubes, on stands 30 and are attached to the slide 15. The guide screw 25 is coupled to a gear box 32, which is driven by an electric motor by a variable speed transmission 33. The motor 34 as well as the transmission 33 and the gear box 32 are carried by the headstock 27.

The device for axial coupling of the work piece 20 to the guide screw 25 comprises a spanner 35 extending axially through the screw 25 and is provided at one end with a head 36 adapted to be inserted into and driven by the gear box 32. At the opposite end the spanner 35 is provided with screw threads 37 threaded into an axial bore 38 with corresponding threads in the adjacent end of the work piece 20 shaped to form a centering tenon 39. The last-mentioned end is provided with a transverse notch 40 corresponding to a transverse notch 41 in the adjacent end of the guide screw 25. A wedge 42 is adapted to be inserted into said notches 40 and 41 and to be freely passed through by the spanner 35. Upon insertion of the latter the work piece 20 will be axially coupled to the guide screw 25 and is forced to rotate with the same.

The nut in the nut house 24 comprises two sleeves 45, 46 having internal threads 44 fitting the threads 43 of the guide screw 25. The sleeves 45, 46 are adapted to be screwed into the nut house 24 from opposite ends of the same. One of the sleeves can be screwed in axial direction and be clamped by means of a locking nut 47 in a suitable axial position relative to the other sleeve 45 in such a way that in case axial play occurs between the guide screw and the nut this play is eliminated.

The device for flushing away metal chips of the work piece comprises, as shown in FIGS. 2 and 4, a ring chamber 48 in a flush housing 49 enclosing the guide screw 25 and the work piece 20; a feeding conduit 50 for flushing fluid is coupled to the housing 49 as well as a drainage conduit 51 for the fluid. The bracket 22 further carries a bowl 52 for catching flushing liquid which may escape axially along the threads 43 from the flush housing 49 at the ends of the same.

When the work piece 20 has been coupled to the guide screw 25 and the latter, after having been put through the flush device 23 and the nut house 24, has been coupled to the gear housing 32, the spindle 10 with the cutter 11 is adjusted in such a way that the cutter engages the threads 43 close to the coupling device 26. When thereupon the motors 7 and 34 are started, the guide screw 25 is screwed through the nut house 24 to the right according to FIGS. 1 and 2 bringing along the work piece 20 whereby by means of the rotating cutter 11 the work piece is threaded.

Burrs that may remain, are removed by means of the trimming tool 21. In the flushing chamber 48 the threads in the work piece 20 are flushed when the piece 20 reaches into the flush housing 49. The threaded work piece 20 serves when it reaches into the nut house 24 as a guide screw.

It is thus obvious that almost unlimited long work pieces 20 can be threaded even though the guide screw 25 is rather short.

The machine can be used for cutting threads in screw spindles and the like with one, two or three entrances of the threads. When screw spindles with several thread entrances are to be cut, the guide screw 25 may be provided only with one entrance when on the headstock 27 there is arranged a dividing apparatus or head by means of which the guide screw and thus also the work piece 20 can be rotated the desired part of a revolution. The guide screw 25 should then (adjacent to the coupling device 26) also be provided with a peripheral groove (not shown) serving for the idling of the cutter 11 so that the guide screw can be turned for a new adjustment when the cutter is in this groove. The sleeves 45, 46 enclosed in the guide nut must of course be shaped or internally threaded or provided with guide pins or similar guiding means engaging in the threads corresponding to said threads 33 in the guide screw 25.

The present invention has been described in detail above for purposes of illustration only and is not intended to be limited by this description or otherwise except as defined in the appended claims. The cutter 11 can be replaced by another chip cutting tool, e.g. a grinding disc, and the machine can thus be used for grinding existing threads in the work piece 20. A brush may be arranged in the flush housing for cleaning the threads.

What I claim is:

1. A machine tool for cutting and/or treating threads of a rod-shaped work piece, said machine provided with a driven cutting tool, a nut being adjustable relative to said tool and passed through by a driven guide screw with a device for its axial coupling to a rod-shaped work piece, means adapted, during rotation, to move said work piece, when it has been provided with threads by means of said cutting tool, axially through said nut so that said work piece thereupon may serve as a guide screw, the end of said guide screw situated opposite said work piece carried by a headstock movable on a guide and provided with a device for driving said guide screw, said driving device comprising a variable speed transmission.

2. A machine tool for cutting threads of a rod-shaped work piece, said machine being provided with a driven cutting tool, a nut being adjustable relative to said tool and passed through by a driven guide screw with a device for its axial coupling to a rod-shaped work piece, means adapted, during rotation, to move said work piece, when it has been provided with threads by means of said cutting tool, axially through said nut so that said work piece thereupon may serve as a guide screw, the end of said guide screw situated opposite said work piece being carried by a headstock movable on a guide and provided with a device for driving said guide screw, said driving device comprising a variable speed transmission, said nut comprising two sleeves which are adjustable axially relative to each other and have internal threads fitting the threads of said guide screw.

3. A machine tool for cutting treating threads of a rod-shaped work piece, said machine being provided with a driven cutting tool, a nut being adjustable relative to said tool and passed through by a driven guide screw with a device for its axial coupling to a rod-shaped work piece, means adapted, during rotation, to move said work piece, when it has been provided with threads by means of said cutting tool, axially through said nut so that said work piece thereupon may serve as a guide screw, the end of said guide screw situated opposite said work piece carried by a headstock movable on a guide and provided with a device for driving said guide screw, said driving device comprising a variable speed transmission, said nut comprising two sleeves which are adjustable axially relative to each other and have internal threads fitting the threads of said guide screw and said nut being replaceably arranged in a nut housing on a slide of the machine.

4. A machine tool for cutting threads of a rod-shaped work piece, said machine being provided with a driven cutting tool, a nut being adjustable relative to said tool and passed through by a driven guide screw with a device for its axial coupling to a rod-shaped work piece, means adapted, during rotation, to move said work piece, when it has been provided with threads by means of said cutting tool, axially through said nut so that said work piece thereupon may serve as a guide screw, the end of said guide screw situated opposite said work piece being carried by a headstock movable on a guide and provided with a device for driving said guide screw, said driving device comprising a variable speed transmission and a device between said tool and said nut for flushing and, if necessary, for brushing off metal chips from the screw threads on said work piece before the same reaches said nut.

References Cited by the Examiner

UNITED STATES PATENTS

| | | | |
|---|---|---|---|
| 1,256,471 | 2/1918 | Genero | 90—22 X |
| 1,608,940 | 11/1926 | Holmes | 10—105 |
| 1,965,035 | 7/1934 | Godziewski | 90—11.62 X |
| 2,775,167 | 12/1956 | Wagner et al. | 82—5 |
| 3,066,330 | 12/1962 | Howe et al. | 82—5 X |

FOREIGN PATENTS

| | | |
|---|---|---|
| 470,658 | 8/1937 | Great Britain. |
| 373,817 | 4/1923 | Germany. |

WILLIAM W. DYER, Jr., *Primary Examiner.*